US012762116B2

(12) United States Patent
Hawes et al.

(10) Patent No.: US 12,762,116 B2
(45) Date of Patent: Oct. 13, 2026

(54) LARGE LANGUAGE MODEL RESPONSE OPTIMIZATION USING CUSTOM COMPUTER LANGUAGES

(71) Applicant: Palantir Technologies Inc., Denver, CO (US)

(72) Inventors: Matthew Hawes, Denver, CO (US); Ankit Shankar, San Francisco, CA (US); Matthew Bayer, Brooklyn, NY (US)

(73) Assignee: Palantir Technologies Inc., Aventura, FL (US)

( * ) Notice: Subject to any disclaimer, the term of this patent is extended or adjusted under 35 U.S.C. 154(b) by 174 days.

(21) Appl. No.: 18/674,672

(22) Filed: May 24, 2024

(65) Prior Publication Data

US 2024/0403290 A1 Dec. 5, 2024

Related U.S. Application Data

(60) Provisional application No. 63/520,043, filed on Aug. 16, 2023, provisional application No. 63/505,212, filed on May 31, 2023.

(51) Int. Cl.
*G06F 16/242* (2019.01)

(52) U.S. Cl.
CPC .................................. *G06F 16/243* (2019.01)

(58) Field of Classification Search
CPC ......................... G06F 16/243; G06F 16/24522
See application file for complete search history.

(56) References Cited

U.S. PATENT DOCUMENTS 8,443,207 B2 * 5/2013 Yan ........................ H04L 9/3271 713/193
2006/0100856 A1 * 5/2006 Kang .................... G06F 40/242 704/9
2010/0131275 A1 * 5/2010 Paek ....................... G10L 15/22 704/E15.001
2017/0229116 A1 8/2017 Melnikov
(Continued)

OTHER PUBLICATIONS

ANTLR, "What is ANTLR?", Another Tool for Language Recognition, Latest News, https://www.antlr.org/, retrieved Jun. 10, 2024, in 2 pages.
(Continued)

*Primary Examiner* — Darioush Agahi
(74) *Attorney, Agent, or Firm* — Knobbe, Martens, Olson & Bear, LLP

(57) ABSTRACT

A system may receive a natural language query and receive an indication of a format of a first computer language as well as an indication of one or more computer-based tools stored in and/or accessible by the system. The system can transmit a prompt to a large language model ("LLM"). The prompt may include the natural language query, the indication of the format, and the indication of the one or more computer-based tools. The system can receive, from the LLM, a response to the prompt in the format of the first computer language. The system can parse the response in the first computer language to identify at least: a computer-based tool of the one or more computer-based tools. The system
(Continued)

can generate a second query in a second computer language and provide the second query in the second computer language to the computer-based tool.

20 Claims, 7 Drawing Sheets

(56) References Cited

U.S. PATENT DOCUMENTS

| | | | |
|---|---|---|---|
| 2018/0349377 | A1* | 12/2018 | Verma ............... G06F 16/24522 |
| 2022/0075962 | A1* | 3/2022 | Kovarík ................ G06F 40/186 |
| 2024/0256764 | A1 | 8/2024 | Maschmeyer et al. |
| 2024/0303424 | A1* | 9/2024 | Reddy ..................... G06F 40/40 |
| 2024/0319976 | A1 | 9/2024 | Benamu et al. |
| 2024/0330365 | A1 | 10/2024 | Zawadowskiy et al. |
| 2024/0362409 | A1* | 10/2024 | Kuan ...................... G06F 40/30 |
| 2024/0378390 | A1 | 11/2024 | Korganyan et al. |
| 2024/0386058 | A1* | 11/2024 | Thomas ................ G06F 40/103 |
| 2024/0386216 | A1 | 11/2024 | Sodhi et al. |
| 2024/0427567 | A1 | 12/2024 | Murthy et al. |
| 2025/0005288 | A1 | 1/2025 | Amatriain-Rubio et al. |
| 2025/0094171 | A1 | 3/2025 | Isaacson et al. |
| 2025/0094439 | A1 | 3/2025 | Telling et al. |

OTHER PUBLICATIONS

LangChain Unstructured, "Transforming natural language data from raw to machine learning ready", https://blog.langchain.dev/langchain-unstructured/, Feb. 5, 2023, in 4 pages.

LangChain Unstructured, "Announcing LangChainJS support for multiple JS environments" https://blog.langchain.dev/js-envs/, Apr. 11, 2023, in 6 pages.

Liu, "Combining text-to-SQL with semantic search for retrieval augmented generation", https://www.llamaindex.ai/blog/combining-text-to-sql-with-semantic-search-for-retrieval-augmented-generation-c60af30ec3b, LlamaIndex, May 28, 2023, in 14 pages.

Wang et al., "Grammar prompting for domain-specific language generation with large language models", https://arxiv.org/pdf/2305.19234v1, May 30, 2023, in 24 pages.

Beurer-Kellner et al., "Prompting is programming: A query language for large language models", Proceedings of the ACM on Programming Languages, vol. 7(1886):1946-1969 (2023).

* cited by examiner

204

```
const query ={
 input: {
   filter:{
       prperty: “b”,
       value:”2",
       operator: “==”,
   },
   input: {
    objectType: “k42k2sgx.equipment”,
   }
 },
 filter: {
   property: “a”,
   value:”1",
   operator: “==”
 }
}
```

FIG. 2A

208

```
TOOL OBJECT_TYPE
OBJECT_TYPE k42k2sgx.equipment
FILTER a=1
FILTER b=2
```

FIG. 2B

```
TOOL OBJECT_TYPE
OBJECT_TYPE "matt's object"
FILTER a==1
FILTER b==2
LIMIT 3
```

FIG. 3A

```
QUERY: TOOL OBJECT_TYPE
OBJECT_TYPE: "matt's object"
FILTER:
   -a==1
   -b==2
LIMIT:3
```

FIG. 3B

```
QUERY: TOOL OBJECT_TYPE
OBJECT_TYPE: "matt's object"
FILTER: a==1 AND b==2
LIMIT:3
```

FIG. 3C

```
QUERY: TOOL OBJECT_TYPE LIMIT
OBJECT_TYPE: "matt's object"
FILTER: a=1
FILTER: b=2
LIMIT:3
```

FIG. 3D

LARGE LANGUAGE MODEL RESPONSE OPTIMIZATION USING CUSTOM COMPUTER LANGUAGES

CROSS-REFERENCE TO RELATED APPLICATIONS

This application claims benefit of U.S. Provisional Patent Application No. 63/505,212, filed May 31, 2023, and titled "CUSTOM PROGRAMMING LANGUAGES FOR LLMS," and U.S. Provisional Patent Application No. 63/520,043, filed Aug. 16, 2023, and titled "LARGE LANGUAGE MODEL RESPONSE OPTIMIZATION USING CUSTOM COMPUTER LANGUAGES." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Implementations of the present disclosure relate to systems and techniques for optimization of responses from large language models. More specifically, implementations of the present disclosure relate to computerized systems and techniques for using a custom computer language for interacting with large language models to optimize responses from the large language models.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computers can be programmed to perform calculations and operations utilizing one or more computer-based models. Various techniques have been developed to minimize the effort required by a human user in in adapting and reprogramming the computer for utilizing such computer-based models.

SUMMARY

The systems, methods, and devices described herein each have several aspects, no single one of which is solely responsible for its desirable attributes. Without limiting the scope of this disclosure, several non-limiting features will now be described briefly.

Computer-based models (generally referred to herein as "models") have become important tools in providing effective responses to complex prompts. These models, which include large language models ("LLMs"), may be optimized to receive natural language inputs, and provide outputs in natural language. While these models can be instructed (e.g., via an input query or prompt) to respond to in a desired format (and/or computer language), such as in a format that is more precise and/or easily parsable by a computer, they often fail to do so without errors because such formats may have characteristics (e.g., including syntax) that are quite different from natural language. In particular, as the complexity of the prompt and/or response increases, the chances of receiving an incomplete or even incorrect response in a particular format increases. These models may not be able to satisfactorily manage the logic of the specified format in the output while also managing the logic and/or demands of the substance of the prompt itself. This problem is especially evident when the prompt and/or the response are formatted in a format that includes highly nested-logic syntax, such as JSON. JSON often requires a series of nested characters (e.g., curly brackets or braces) to properly express certain logical instructions. Computer-based models, including LLMs, may not be optimized to provide outputs with such syntax.

Various combinations of the features, embodiments, implementations, and aspects recited herein are also disclosed and contemplated by the present disclosure. Additional implementations of the disclosure are described below in reference to the appended claims, which may serve as an additional summary of the disclosure.

In various implementations, systems and/or computer systems are disclosed that comprise one or more computer-readable storage mediums having program instructions embodied therewith, and one or more processors configured to execute the program instructions to cause the systems and/or computer systems to perform operations comprising one or more aspects of the above- and/or below-described implementations (including one or more aspects of the appended claims).

In various implementations, computer-implemented methods are disclosed in which, by one or more processors executing program instructions, one or more aspects of the implementations described herein (including one or more aspects of the appended claims) are implemented and/or performed.

In various implementations, computer program products comprising one or more computer-readable storage mediums are disclosed, wherein the computer-readable storage mediums have program instructions embodied therewith, the program instructions executable by one or more processors to cause the one or more processors to perform operations comprising one or more aspects of the implementations described herein (including one or more aspects of the appended claims).

BRIEF DESCRIPTION OF THE DRAWINGS

The following drawings and the associated descriptions are provided to illustrate implementations of the present disclosure and do not limit the scope of the claims. Aspects and many of the attendant advantages of this disclosure will become more readily appreciated as the same become better understood by reference to the following detailed description, when taken in conjunction with the accompanying drawings.

FIG. 2A shows an example set of code for executing a filter action, according to one implementation.

FIG. 2B shows a filter instruction that includes an equivalent filter instruction as FIG. 2A using an example custom computer language.

FIGS. 3A-3D show example formats of filter instructions, according to various implementations.

DETAILED DESCRIPTION

Figure 1:
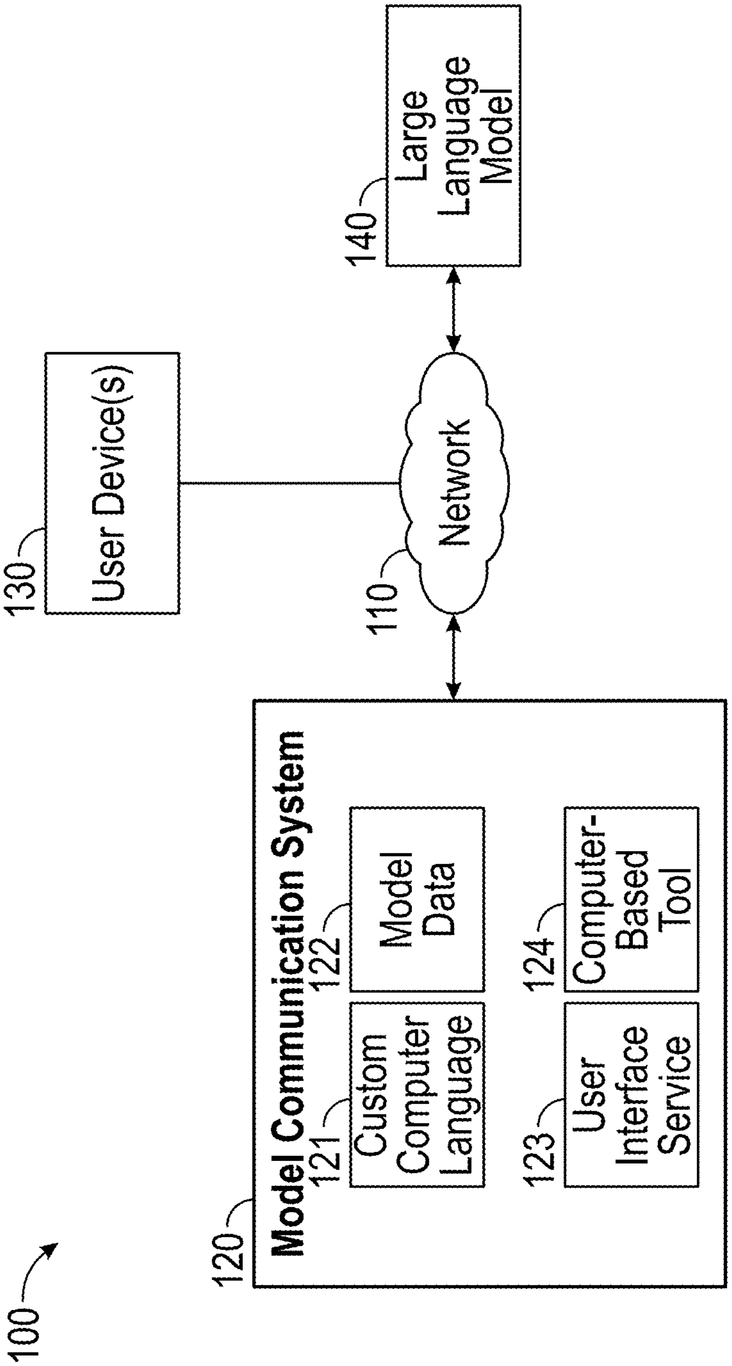
FIG. 1 illustrates an example computing environment including a model communication system, according to one implementation.

Although certain preferred implementations, embodiments, and examples are disclosed below, the inventive subject matter extends beyond the specifically disclosed implementations to other alternative implementations and/or uses and to modifications and equivalents thereof. Thus, the scope of the claims appended hereto is not limited by any of the particular implementations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain implementations; however, the order of description should not be construed to imply that these operations are order dependent. Additionally, the structures, systems, and/or devices described herein may be embodied as integrated components or as separate components. For purposes of comparing various implementations, certain aspects and advantages of these implementations are described. Not necessarily all such aspects or advantages are achieved by any particular implementation. Thus, for example, various implementations may be carried out in a manner that achieves or optimizes one advantage or group of advantages as taught herein without necessarily achieving other aspects or advantages as may also be taught or suggested herein.

Overview

Computer-based models (generally referred to herein as "models") have become important tools in providing effective responses to complex prompts. These models, which include large language models ("LLMs"), may be optimized to receive natural language inputs, and provide outputs in natural language. While these models can be instructed (e.g., via an input prompt) to respond to in a desired format (and/or computer language), such as in a format that is more precise and/or easily parsable by a computer, they often fail to do so without errors because such formats may have characteristics (e.g., including syntax) that are quite different from natural language. In particular, as the complexity of the prompt and/or response increases, the chances of receiving an incomplete or even incorrect response in a particular format increases. These models may not be able to satisfactorily manage the logic of the specified format in the output while also managing the logic and/or demands of the substance of the prompt itself. This problem is especially evident when the prompt and/or the response are formatted in a format that includes highly nested-logic syntax, such as JSON. JSON often requires a series of nested characters (e.g., curly brackets or braces) to properly express certain logical instructions. Computer-based models, including LLMs, may not be optimized to provide outputs with such syntax.

The systems and methods described herein may improve interactions with the LLM by reducing a number of "tokens" (e.g., characters or sets of characters) present in or required for a prompt to the LLM. Some LLMs allow only a certain number of tokens per query or prompt. Thus, a custom computer language that can reduce a total number of tokens may allow interactions with the LLM that were previously impossible based on the number of tokens needed to present the target prompt. Additionally or alternatively, reducing a number of tokens may increase a complexity of prompt that can be presented to the LLM. Thus, the custom computer languages described herein can allow prompts to be presented in fewer tokens. This can result in a higher token density (e.g., arguments per token, instructions per token). The increased token density can be as high as 2×, 5×, 10×, 50×, and sometimes even over 100×, compared to a conventional computer language token density, depending on the nature of the prompt. For example, a higher token density will be expected from the custom computer language if a highly nested or highly ordered conventional computer language is being replaced.

For example, the custom computer languages described herein can reduce the number of interactions with the LLM that are required. For example, the custom computer language can cause the LLM to address multiple needs in the same prompt, rather than requiring a plurality of sequential prompts. The custom computer language may allow for named entities that can be referenced later in the same or later prompt. This may not be possible with relevant conventional computer languages to be replaced by the custom computing language. This can improve the token density of the prompt and/or improve the readability (e.g., by a custom computer language parser, by a human) of the LLM response. The named entities can result in more compact expressions, more understandable expressions, and/or higher accuracy of the prompts and/or responses.

Because the LLM is able to make certain language inferences, the custom computer language can include inferences that do not explicitly identify a specific type or typing of expressions, variables, arguments, or other elements of the prompt. For example, an argument in a custom computer language may be descriptive of the function of the argument or of its location among the other elements (e.g., arguments, variables, expressions) so that the LLM can reliably and accurately infer relevant information about the element. The LLM can efficiently infer types of elements based on the descriptive nature of the custom computer language. Accordingly, the custom computer language implements such descriptive terms because the LLM is able to infer the function of the element. Additionally or alternatively, a parser may be able to infer those implicit types/typings in the LLM responses that are in the custom computer language. Such types/typings may be referred to as "inferred" or "implicit" elements (e.g., inferred element types, implicit arguments, inferred arguments, etc.).

The present disclosure includes a system, methods, and software (generally referred to herein as "the system") for providing improved (including more accurate and more efficient) interactions with LLMs. The present disclosure further includes various processes, functionality, and interactive graphical user interfaces related to the system. According to various implementations, the system (and related processes, functionality, and/or interactive graphical user interfaces), includes one or more custom computer languages (which can include specific syntax and formatting) that are advantageously optimized for LLM interactions.

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

The term "model," as used in the present disclosure, can include any computer-based models of any type and of any level of complexity, such as any type of sequential, functional, or concurrent model. Models can further include various types of computational models, such as, for example, artificial neural networks ("NN"), language models ("LMs") (e.g., large language models ("LLMs")), artificial intelligence ("AI") models, machine learning ("ML") models, multimodal models (e.g., models or combinations of models that can accept inputs of multiple modalities, such as images and text), and/or the like.

A Language Model ("LM") is any algorithm, rule, model, and/or other programmatic instructions that can predict the probability of a sequence of words. A language model may, given a starting text string (e.g., one or more words), predict the next word in the sequence. A language model may calculate the probability of different word combinations based on the patterns learned during training (based on a set of text data from books, articles, websites, audio files, etc.). A language model may generate many combinations of one or more next words (and/or sentences) that are coherent and contextually relevant. Thus, a language model can be an advanced artificial intelligence algorithm that has been trained to understand, generate, and manipulate language. A language model can be useful for natural language processing, including receiving natural language prompts and providing natural language responses based on the text on which the model is trained. A language model may include an n-gram, exponential, positional, neural network, and/or other type of model.

A Large Language Model ("LLM") is any type of language model that has been trained on a larger data set and has a larger number of training parameters compared to a regular language model. An LLM can understand more intricate patterns and generate text that is more coherent and contextually relevant due to its extensive training. Thus, an LLM may perform well on a wide range of topics and tasks. LLMs may work by taking an input text and repeatedly predicting the next word or token (e.g., a portion of a word, a combination of one or more words or portions of words, punctuation, and/or any combination of the foregoing and/or the like). An LLM may be of any type, including a Question Answer ("QA") LLM that may be optimized for generating answers from a context, a multimodal LLM/model, and/or the like. An LLM (and/or other models of the present disclosure) may include, for example, a NN trained using self-supervised learning and/or semi-supervised learning, a feedforward NN, a recurrent NN, and/or the like. An LLM (and/or other models of the present disclosure) may further include, for example, attention-based and/or transformer architecture or functionality.

While certain aspects and implementations are discussed herein with reference to use of a language model, LLM, and/or AI, those aspects and implementations may be performed by any other language model, LLM, AI model, generative AI model, generative model, ML model, NN, multimodal model, and/or other algorithmic processes. Similarly, while certain aspects and implementations are discussed herein with reference to use of a ML model, those aspects and implementations may be performed by any other AI model, generative AI model, generative model, NN, multimodal model, and/or other algorithmic processes.

In various implementations, the LLMs and/or other models (including ML models) of the present disclosure may be locally hosted, cloud managed, accessed via one or more Application Programming Interfaces ("APIs"), and/or any combination of the foregoing and/or the like. Additionally, in various implementations, the LLMs and/or other models (including ML models) of the present disclosure may be implemented in or by electronic hardware such application-specific processors (e.g., application-specific integrated circuits ("ASICs")), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data, and/or the like.

Examples of models, language models, and/or LLMs that may be used in various implementations of the present disclosure include, for example, Bidirectional Encoder Representations from Transformers (BERT), LaMDA (Language Model for Dialogue Applications), PaLM (Pathways Language Model), PaLM 2 (Pathways Language Model 2), Generative Pre-trained Transformer 2 (GPT-2), Generative Pre-trained Transformer 3 (GPT-3), Generative Pre-trained Transformer 4 (GPT-4), LLAMA (Large Language Model Meta AI), and BigScience Large Open-science Open-access Multilingual Language Model (BLOOM).

A data store can be any computer-readable storage medium and/or device (or collection of data storage mediums and/or devices). Examples of data stores include, but are not limited to, optical disks (e.g., CD-ROM, DVD-ROM, and the like), magnetic disks (e.g., hard disks, floppy disks, and the like), memory circuits (e.g., solid state drives, random-access memory (RAM), and the like), and/or the like. Another example of a data store is a hosted storage environment that includes a collection of physical data storage devices that may be remotely accessible and may be rapidly provisioned as needed (commonly referred to as "cloud" storage).

A database can be any data structure (and/or combinations of multiple data structures) for storing and/or organizing data, including, but not limited to, relational databases (e.g., Oracle databases, PostgreSQL databases, MySQL databases and the like), non-relational databases (e.g., NoSQL databases, and the like), in-memory databases, spreadsheets, as comma separated values ("CSV") files, extensible markup language ("XML") files, TeXT ("TXT") files, flat files, spreadsheet files, and/or any other widely used or proprietary format for data storage. Databases are typically stored in one or more data stores. Accordingly, each database referred to herein (e.g., in the description herein and/or the figures of the present application) can be understood as being stored in one or more data stores. Additionally, although the present disclosure may show or describe data as being stored in combined or separate databases, in various implementations such data may be combined and/or separated in any appropriate way into one or more databases, one or more tables of one or more databases, and/or the like.

A data object or object (also referred to herein as data entities or entities) can be a data container for information representing a specific thing in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g., metadata about the object) may be represented in one or more properties. Attributes may include, for example, a geographic location associated with the item, a value associated with the item, a probability associated with the item, an event associated with the item, and so forth.

The system may comprise one or more interactive graphical user interfaces ("GUIs") configured to allow a user to create and/or input prompts to the computer model and/or to receive a response to the prompts. The GUI may be presented by a display to a user.

In some implementations, the system may further include one or more Large Language Models ("LLMs") to allow for more flexible interaction, such as through receiving natural language instructions, with a user of the system. In some implementations, the system may receive a request from a user to generate a new process. The request may be in natural language form. The system may then apply the request to the LLM to generate a desired response. The LLM may provide a result of the analysis of the request. As discussed below, the response may be in a format of a target (e.g., custom) computer language.

In some implementations, the system may receive a request from a user (e.g., a prompt from the user), comprising a natural language description of a notional process. The system may then, using the LLM, generate the notional process comprising one or more states and one or more transitions.

According to various implementations, the system can incorporate and/or communicate with one or more LLMs to perform various functions. Such communications may include, for example, a context associated with an aspect or analysis being performed by the system, a user-generated prompt, an engineered prompt, prompt and response examples, example or actual data, and/or the like. For example, the system may employ an LLM, via providing an input to, and receiving an output from, the LLM. The output from the LLM may be parsed and/or a format of the output may be updated to be usable for various aspects of the system.

The system may employ an LLM to, for example, determine a modeling objective (e.g., based on one or more models and/or other information), identify additional models that may be related to the modeling objective, determine or generate a model location, determine or generate a model adapter configuration, determine or generate a sandbox or container implementation, and/or the like.

Example System and Related Computing Environment

FIG. 1 illustrates an example computing environment 100 including a model communication system 120 (referred to herein as "system 120"). The system 120 may include custom computer language 121, model data 122, a user interface service 123, and one or more computer-based tool(s) 124. The system 120 may be connected via network 110 to other computing devices, such as user device(s) 130 and/or large language model 140. The system may interact via the network 110 with the large language model 140. For example, the user device(s) 130 may transmit a request to the system 120, to execute a prompt using the large language model 140. The system 120 may receive the request from the user device(s) 130 and in response and/or transmit a request to the large language model 140 to execute one or more large language model 140. The large language model 140 may receive the request from the system 120 and in response, transmit to the user device(s) 130 and/or the system 120, information based on the results of analysis by the large language model 140. In some implementations, the model communication system 120 includes the large language model 140. In some implementations, the example computing environment may include multiple large language models 140, which may be included internal and/or external to the model communication system 120, in any combination. Additionally or alternatively, the computer-based tool 124 may be external to the model communication system 120 in some implementations.

The custom computer language 121 can include details used for a prompt to the LLM, such as commands, examples, grammatical structure or other features of a custom computer language, and/or other features described below. For example, the custom computer language 121 can include how an LLM response should be formatted. The custom computer language 121 can include specifications of how the custom computer language should be understood by an LLM, what certain terms mean in the custom computer language, examples of acceptable commands in the custom computer language, examples of sentences and/or arguments in the custom computer language, examples of acceptable syntax (e.g., punctuation, word order, capitalization, etc.) in the custom computer language, and/or other details related to the custom computer language described herein.

Model data 122 can include object data representing characteristics of one or more models within the system 120, such as the computer-based tool(s) 124. Additionally, and/or alternatively, model data 122 can include object data representing characteristics of associated models hosted on third-party platforms, such as the large language model 140.

The user interface service 123 may allow the system 120 to interact with the user. The user interface service 123 may generate a graphical user interface ("GUI") displayed on a client device, such as user device(s) 130. User interface service 123 may also receive data entered by a user into a client device, such as user device(s) 130, and may store and/or forward it to the other various components of the system 120.

Users may use user device(s) 130 to view and/or interact with a GUI provided by the user interface service 123. For example, the user device(s) 130 can include a wide variety of computing devices, including personal computing devices, terminal computing devices, laptop computing devices, tablet computing devices, electronic reader devices, mobile devices (e.g., desktop computer, notebook computer, smartphone, or any other type of computing device) and associated software (e.g. a browser capable of rendering output from information provided by, for example, user interface service 123).

The large language model 140 can be a third-party server and/or data store implemented as a computer system having logical elements. In an implementation, the logical elements may comprise program instructions recorded on one or more machine-readable storage media. Alternatively, the logical elements may be implemented in hardware, firmware, or a combination thereof. The large language model 140 may include one or more modules. In one example, the large language model 140 can include large language model 140. Large language model 140 can be located external to the system 120, for example within one or more large language model 140.

The computer-based tool 124 can include one or more tools stored in a memory of the model communication system 120. The computer-based tool 124 may include software (e.g., plugins) that may be executed by the system or be configured to communicate with the LLM as well as proprietary and/or publicly available data sources for consummating certain services, tasks or processing. Additionally or alternatively, the computer-based tool 124 may include hardware and/or firmware tools. The computer-based tool 124 can include one or more tools that the model communication system 120 can use to provide further analysis on and/or build on details from a response from the LLM.

The computer-based tool 124 can include a calculator, an internal database search tool, a reference tool, an object type identifier, a library (e.g., within a computer language), a geographic locator tool, a medical imaging tool, and/or any other tool that is stored on and/or accessible by the model communication system 120. For example, in some implementations the model communication system 120 can be accessed from and/or via a remote computing device. The remote computing device (not shown in FIG. 1) may be connected to the model communication system 120 via the network 110. In response to being passed information, the computer-based tool 124 can output an answer (e.g., an answer to a query or prompt).

Figure 7:
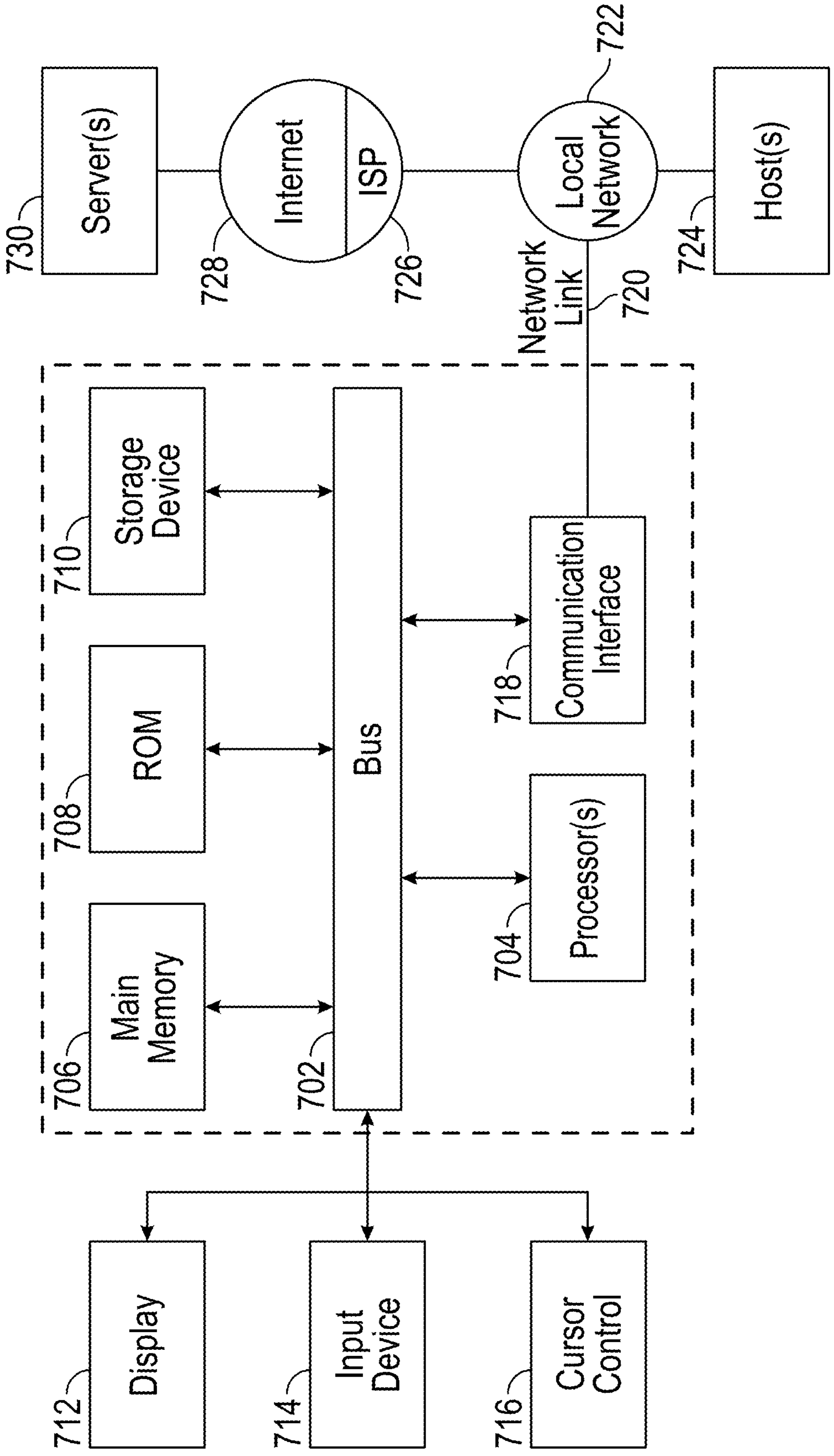
FIG. 7 is a block diagram that illustrates a computer system upon which various implementations may be implemented.

The network 110 can include any one or more communications networks, such as the Internet. The network 110 may be any combination of local area networks ("LAN") and/or a wireless area networks ("WAN") or the like. Accordingly, various components of the computing environment 100, including the system 120, can communicate with one another directly or indirectly via any appropriate communications links and/or networks, such as network 110 (e.g., one or more communications links, one or more computer networks, one or more wired or wireless connections, the Internet, any combination of the foregoing, and/or the like). Similarly, the various components (e.g., as described below) of the system 120 and the computing environment 100 may, in various implementations, communicate with one another directly or indirectly via any appropriate communications links (e.g., one or more communications links, one or more computer networks, one or more wired or wireless connections, the Internet, any combination of the foregoing, and/or the like). FIG. 7, described below, provides additional examples of aspects of implementations of such components of the computing environment 100, the system 120, and the like.

As shown in FIG. 1, the model communication system 120 and the large language model 140 may each send and/or receive information via the network 110. For example, the model communication system 120 may submit a query and/or prompt to the large language model 140 (e.g., via the network 110) and receive (e.g., via the network 110) the response from the large language model 140. The terms "query" and "prompt" may sometimes be used interchangeably. Generally, a natural language query includes a user-selected string corresponding to a kind of request or question. Generally, a prompt may include the natural language query and may further include examples of a format of the custom computer language (e.g., as described herein), additional details related to the natural language query, such as how the LLM should consider the natural language query, how the LLM should tackle the prompt, how the LLM should frame the prompt, and/or other details related to the natural language query and/or the prompt. The natural language query may be relatively short (e.g., a string of a few characters and/or tokens). By contrast, the prompt may be hundreds or thousands of characters and/or tokens long.

This send-receive interaction may be repeated multiple times. For example, the model communication system 120 may submit multiple prompts to the large language model 140 and receive a corresponding number of responses from the large language model 140. The multiple prompts may be modified or updated based on a previous response from the large language model 140. For example, as explained below, the model communication system 120 may improve or optimize one or more aspects of the custom computer language 121 in response to a determination that a prompt resulted in one or more mistakes in the response from the large language model 140. Additionally or alternatively, the model communication system 120 may interact with the large language model 140 sequentially to obtain data over the course of multiple, step-by-step send-receive interactions.

The custom computer language can include a syntax and/or other formatting aspects that are intuitive to a human user (or more intuitive than other computer languages, such as conventional computer languages like JSON). The custom computer language may include some formatting elements (e.g., syntax, terminology) that are somewhat more constrained than natural language, which may allow for more compact responses and/or specific responses and/or prompts than either natural language or conventional computer languages alone can provide.

Custom Computer Language for Prompt and Response

The system can instruct the LLM to output responses in an optimized custom computer language that is both clear for a computer to parse, but also relatively close to natural language so the LLM can handle it better. The custom computer language may be a combination of a structured code or pseudocode, and a natural language. The proposed custom computer language may include structured code or pseudocode, using keywords that are close to natural language (e.g., common root word, different capitalization), and with some parsable structure to give a higher level of precision than natural language. However, the custom computer language can rely on a format (e.g., syntax, terminology, and/or grammatical structure) that is more flexible and/or simpler than JSON or other grammatically rigid languages. The looser format may make the custom computer language easier for the LLM to work in. The system can include an instruction for how the LLM should format the response to be in the custom computer language. The custom computer language can be a first computer language or target computer language, and JSON or some other computer language can be a second computer language, conventional computer language, or final computer language. As noted above, the custom computing language can reduce a total number of tokens in the prompt. The LLM may allow only a maximum number of tokens. Accordingly, the custom computer language can allow the model communication system 120 and/or the user to submit prompts that would otherwise include too many tokens and/or submit prompts that are more complex than other prompts.

FIGS. 2A-2B show examples of differences between a known computer language, such as JSON, and a custom computing language, which may have a less stringent or strict format. FIG. 2A shows an example set of code for executing a filter action. The filter instruction sets “b” to be equal to or defined as “2”. The filter instruction sets “a” to be equal to or defined as “1”. The code also defines an objectType to be k42k2sgx.equipment. FIG. 2A shows this filter instruction in JSON.

FIG. 2B shows a filter instruction that includes an equivalent filter instruction as FIG. 2A using an example custom computer language. The conventional language filter instruction 204 shown is in JSON and shows a filter language with strict formatting requirements. By contrast the custom computer language filter instruction 208 shows how setting the filters for “a” and “b” can be done without strict formatting requirements. For example, the shown custom computer language does not require sets of punctuation (e.g., curly braces, curly brackets, colons, commas, semicolons, periods, quotation marks, line breaks, white space). The custom computer language can also instruct how the response should be formatted or output.

The format of the custom computer language can be looser (e.g., less strictly enforced) than existing or known computer languages, such as JSON. For example, the format may include a looser grammar or grammatical structure, a looser syntax, a looser terminology, and/or another looser aspect of the format. A looser grammar can include fewer punctuation rules, fewer rules surrounding white space and/or line spacing, more options for satisfying the grammatical structure. A looser syntax can include looser rules or requirements for how an arrangement of substantive symbols (e.g., words, phrases). A looser terminology can include less strict rules for which terms will achieve a desired result. For example, synonyms of words and/or phrases may be used in the custom computer language to still fulfill the target instructions. As shown, the number of tokens (e.g., including the curly braces, different lines of code, quotation marks, commas, etc.) is substantially smaller than the number of tokens in the equivalent instructions of, e.g., FIG. 2A.

FIGS. 3A-3D show examples of alternative formats for the same instructions. FIG. 3A shows a first format of code that reflects a filter instruction. FIG. 3A includes “OBJECT_TYPE “matt’s object””, “FILTER a==2”, and “FILTER b==2”. FIG. 3B shows a second format of code that reflects the same filter instruction. FIG. 3B includes “OBJECT_TYPE: “matt’s object”” and references a filter by referencing “–a==2” and “–b==2”. FIG. 3C shows a third format of code that reflects the filter instruction. FIG. 3C includes “OBJECT TYPE: “matt’s object”” and “FILTER: a==2 AND b==2”. FIG. 3D shows a fourth format of code that reflects the filter instruction. FIG. 3D includes “OBJECT_TYPE: “matt’s object”” and “FILTER: a=2 AND b=2”. Each of FIGS. 3A-3D includes different syntax and different terminology.

Figure 4:
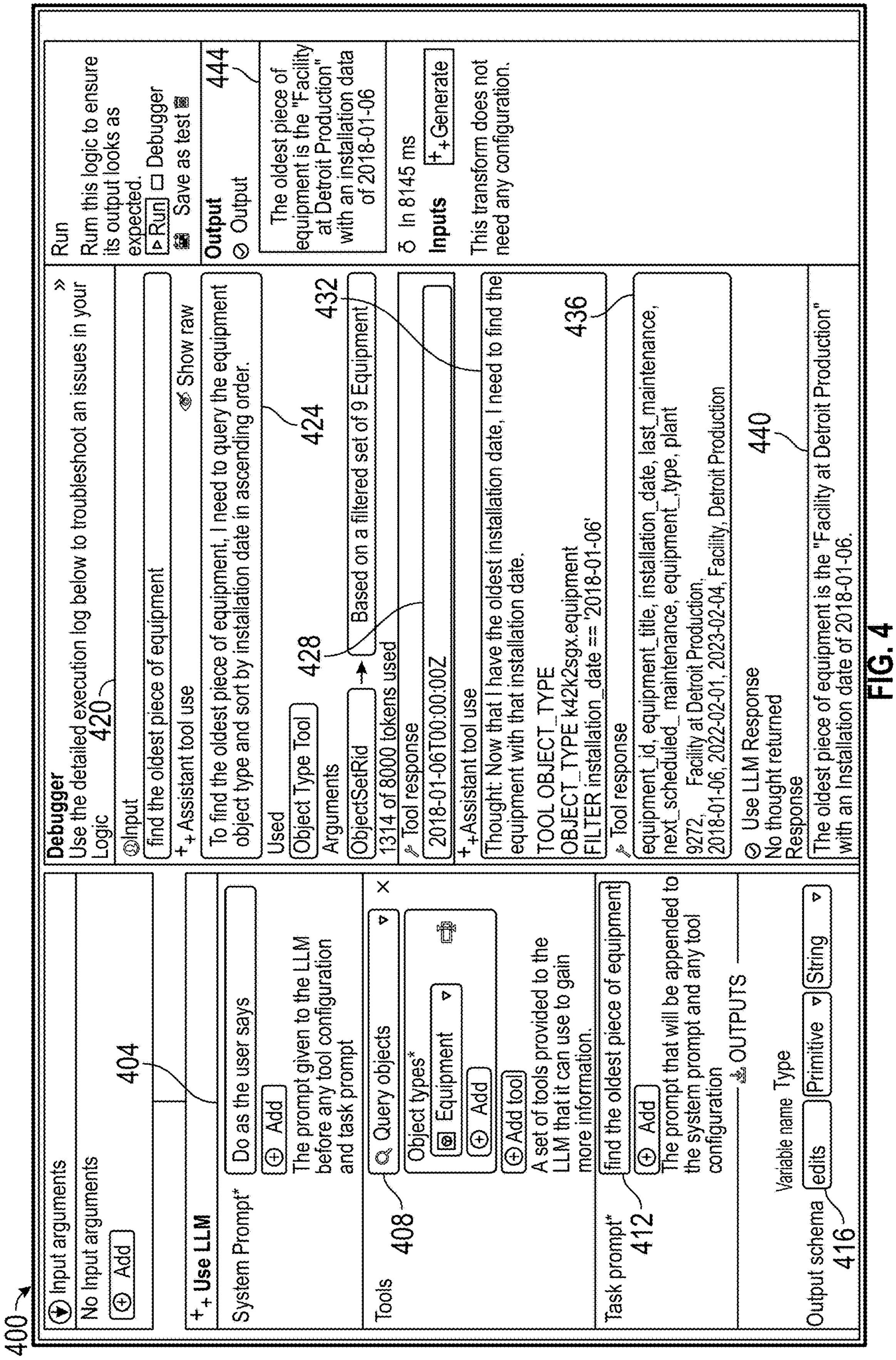
FIG. 4 shows an example user interface in which a user can provide a prompt, according to one implementation.

FIG. 4 shows an example user interface 400 in which a user can provide a prompt. The user interface 400 can include a system prompt selector 404 that allows a user to select a prompt to be sent to the LLM. Here, the prompt states, “Do as the user says”. Additional remarks may be included in the prompt. The system prompt selector 404 may be used to create a long prompt comprising multiple paragraphs of specific instructions, examples of acceptable responses, logical explanations, instructions for formatting the response, and/or other aspects described herein. The instructions for formatting the response can include, for example, a custom computer language in which the response or part of the response should be written. The instructions can include examples of desired or required formatting (e.g., grammatical structure, syntax, terminology, etc.).

The user interface 400 can include a tool selector 408 that allows a user to select one or more tools, identification of certain objects and/or object types to be included in a response from the LLM. Tools may be used at different steps of various interactions (e.g., back and forth) between the model communication system 120 and the LLM. It may be possible for the user to create a multiple-prompt “dialogue” with the LLM where a first task is addressed at a first step, a second task is addressed at a second step, and so forth. Such multi-step dialogue can serve as a kind of fine-tuning of responses from the LLM, where each step gets closer to a desired or target response. At one or more of those steps, one or more same or different tools may be used. The prompt and/or computer-based tool(s) identified by the user can influence how the response from the LLM is prepared, such as by signaling that more steps may be part of the complete analysis and that the current step is just one step of a multiple-step dialogue with the LLM.

A user may additionally or alternatively select a task prompt using a task prompt selector 412 of the user interface 400. In some implementations, the task prompt selector 412 may provide the only allowable input from a user. For example, in some implementations the system may supply the LLM with the system prompt. Additionally or alternatively, the system prompt from the system prompt selector 404 may be substantially the same for each prompt sent to the LLM. For example, the system prompt may be automatically selected and not selected by a user. The task prompt may be concatenated to or otherwise included with the system prompt to create the final prompt that is sent to the LLM. The user interface 400 can additionally or alternatively include a output schema selector 416. The output schema selector 416 may allow a user to select a target output of the LLM by stipulating a kind of one or more variables, a type of variable, and/or an acceptable format (e.g., string) of the output.

The user interface 400 can include an input identifier 420. The input identifier 420 can allow a user to identify what the LLP identified as the input (e.g., the task prompt). This may be reproduced based on instructions provided, for example, by the system prompt. In some implementations, the input from the input identifier 420 corresponds to (e.g., is set to be the same as) the task prompt shown by the task prompt selector 412. The first assistant tool use identifier 424 may identify the LLM’s identification of the main or overall goal of the prompt. The first assistant tool use identifier 424 may be output from the LLM as a response from specific instructions included in the system prompt (e.g., from the system prompt and/or the task prompt). As shown, the first assistant tool use in this example recites, “To find the oldest piece of equipment, I need to query the equipment object type and sort by installation date in ascending order.” The first assistant tool use identifier 424 may correspond to a part of the first response from the LLM out of a plurality of responses during a multi-step “dialogue” with the LLM. The first tool response identifier 428 may include a substantive response from the LLM regarding which tool to use, how to use the tool, and/or what to include as input for a particular tool of the system. As shown, the first tool response identifier 428 shows “2018-01-06T00:00:002”, which corresponds to an input that is to be used in a particular tool. The input identifier 420 and/or first assistant tool use identifier 424 can indicate a query or portion of a query that is in a natural language.

The second assistant tool use identifier 432 and second tool response identifier 436 can correspond to respective outputs from the LLM relating to a second response from the LLM from a second prompt from the system. The first and second prompts that caused the first and second assistant tool uses and/or tool responses may be from a common overarching goal or from separate, discrete goals of a user. The first and second prompts may be essentially sequential (e.g., one right after the other) or separated by significant time and/or other prompts. In this case, the second assistant tool use identifier 432 shows a different assistant tool use than was shown by the first assistant tool use. Naturally, the second tool response is different from the first tool response. The second assistant tool use identifier 432 can indicate a response received from the LLM. As shown, this response may be at least partially in a second or target computer language (e.g., the custom computer language).

The user interface 400 can include a final identifier 440. The final identifier 440 can display a final result or response from the LLM. The final identifier 440 may include an assistant tool use, a tool response, and/or some other portion of the response from the LLM to the prompt. The output identifier 444 can include the same information as in the final identifier 440. Additionally or alternatively, the output identifier 444 may indicate an output from a most recent response from the LLM.

Figure 5:
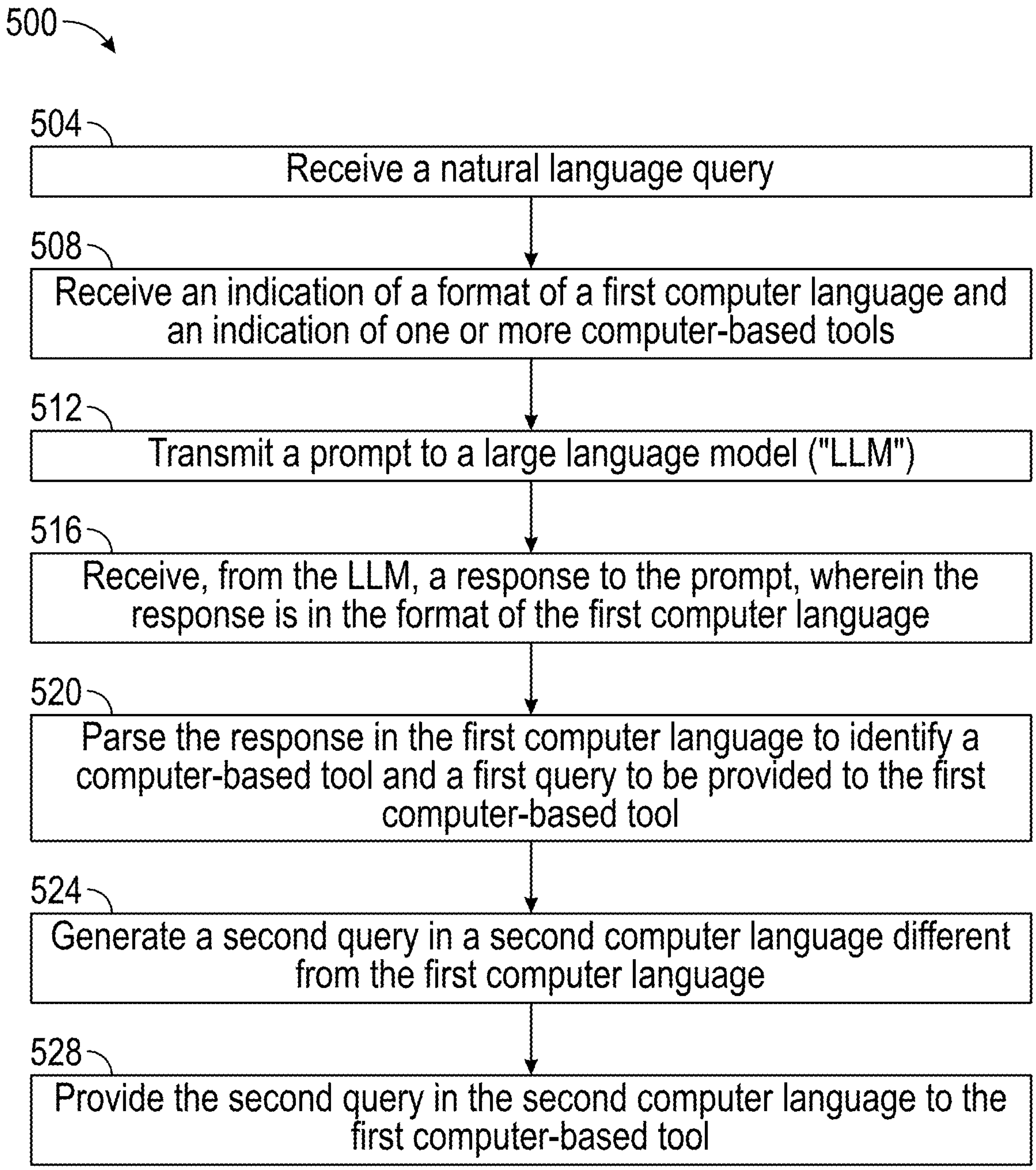
FIG. 5 shows an example of a method for structuring a prompt to cause an LLM to formulate a response in a custom computer language, according to one implementation.

FIG. 5 shows an example of a method 500 for structuring a prompt to cause an LLM to formulate a response in a custom computer language. The example routines or methods herein illustrate various implementations of systems described herein (e.g., the model communication system 120). The blocks of the routines illustrate example implementations, and in various other implementations various blocks may be rearranged, and/or rendered optional. Further, various blocks may be omitted from and/or added to the example routines below, and blocks may be moved between the various example routines.

At block 504, the system can receive a natural language query. The query may be received via a user interface, such as the user interface 400. The query can be tailored to be received by a target LLM, which may be configured to receive a query in a natural language. At block 508, the system can receive an indication of a format of a first computer language and an indication of one or more computer-based tools stored in and/or accessible by the system. The indication of the format can include an example of a grammar or grammatical structure or other instructions for how the grammatical structure of the custom computer language operates. Additionally or alternatively, the indication of the format can include examples and/or other instructions for what constitutes a proper syntax (e.g., acceptable punctuation, acceptable phrasing and/or ordering of terms). Additionally or alternatively, the indication of the format can include examples and/or other instructions for acceptable terminology in the custom computer language. The indication of the format may be automatically provided (e.g., in a system prompt shown in FIG. 4) and/or via a user selection via a user interface (e.g., the user interface 400).

At block 512, the system can transmit a prompt to a large language model ("LLM"). The prompt can include the natural language query, the indication of the format, the indication of the one or more computer-based tools, and/or other features of a prompt described herein. At block 516, the system can receive from the LLM a response to the prompt. The response can be (and, based on the features/instructions of the prompt, should be expected to be) in the format of the first computer language. At block 520, the system can parse the response in the first computer language to identify a first computer-based tool of the one or more computer-based tools and/or a first prompt to be provided to the first computer-based tool. The system may use the first computer-based tool to generate or output an answer to the natural language query and/or in a natural language. For example, the system may generate a second prompt based on the output from the first computer-based tool and/or transmit the second prompt to the LLM based on the second response. The second prompt may be configured to instruct the LLM to respond in natural language. The system may receive from the LLM a third response comprising natural language. For example, the third response may be a kind of final answer (or interim final answer) that the user was initially looking for when preparing the initial natural language prompt.

At block 524, the system can generate a second prompt in a second computer language different from the first computer language. The generation of the second prompt can be based on the parsing of the response and the identified first prompt. At block 528, the system can provide the second prompt in the second computer language to the first computer-based tool.

Automatic Optimization of Grammar of Custom Computer Language

As noted above, LLMs may provide incomplete or inaccurate responses if the computer language and/or logic of the prompt and/or response is too complex. This may be due in part to the complexity of the grammar required by the corresponding computer language, a required syntax (e.g., spelling, capitalization) of the computer language, or some other challenge related to a format of the computer language. For example, highly nested logic structures (e.g., as in JSON) can cause the LLM to respond in an incomplete and/or inaccurately formatted response. Even if the LLM is instructed to output in a custom computer language that is optimized for LLM responses and parsability, the LLM may still, at time, provide outputs with errors, formatting inconsistencies, and/or the like. Accordingly, it can be advantageous for the system to identify mistakes (e.g., incompleteness, inaccuracies, and/or the like) in responses from the LLM that are in a computer language, such as a custom computer language. These mistakes may be quantified, categorized, and/or otherwise tracked to further improve a syntax, format, terminology, and/or grammatical structure of the custom computer language. The system can recursively and/or automatically track these mistakes and make updates to the format of the custom computer language based on the mistakes, and with the object off minimizing the mistakes and further optimizing the custom computer language. A user may support in the analysis, tracking, and/or updating of the format of the custom computer language. The system may track progress over time in the updates to the grammar to help ensure that the updates to the grammar are effective at reducing mistakes in future LLM responses. For example, the system may compare a number of mistakes in a first response with a number of mistakes in a second response to a prompt with the updated grammar.

Figure 6:
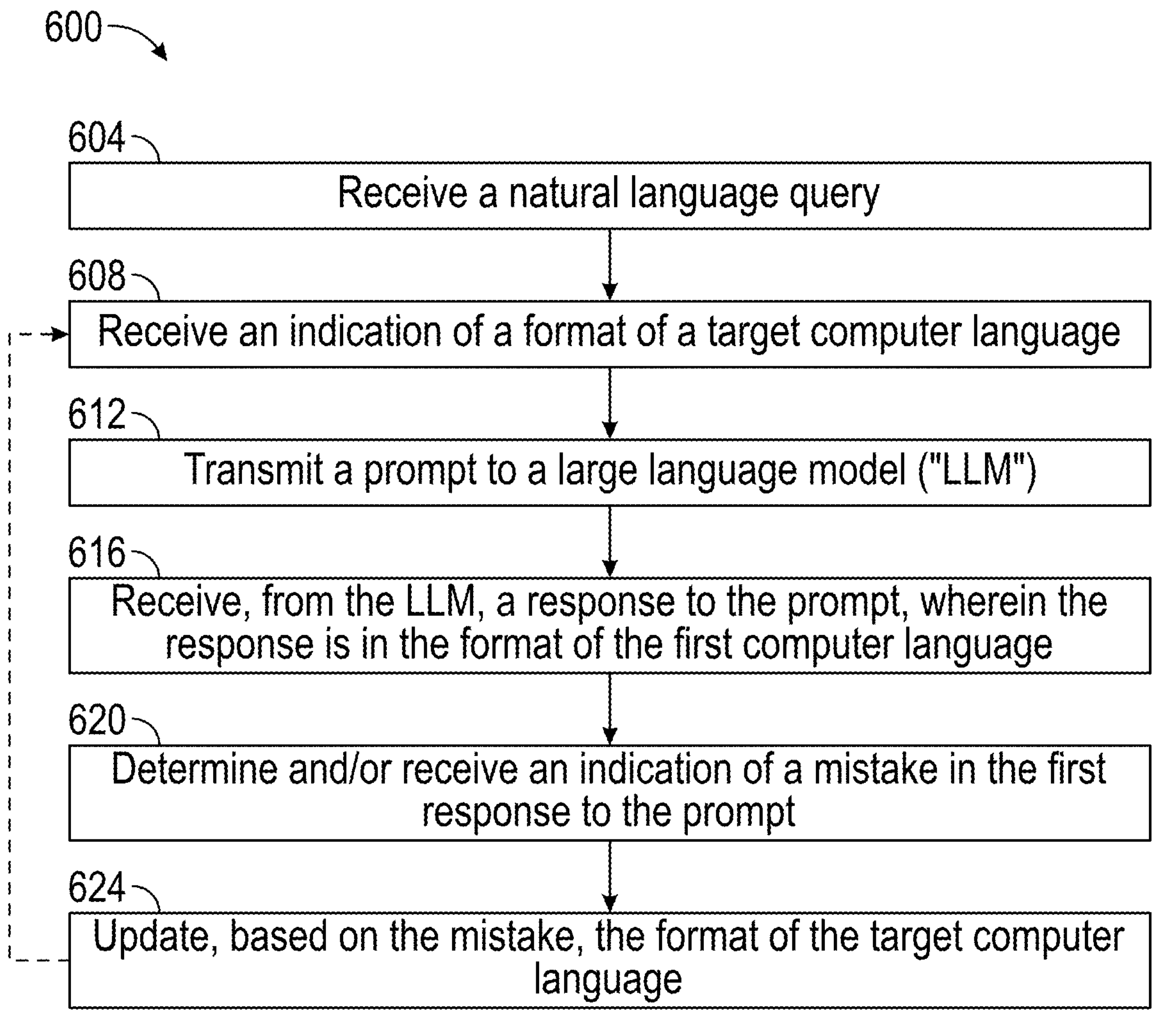
FIG. 6 shows an example method of optimizing a grammar of a custom language described herein, according to one implementation.

FIG. 6 shows an example method 600 of optimizing a grammar of a custom language described herein. At block 604, the system can receive a natural language query. At block 608, the system can receive an indication of a format of a target computer language. Additionally or alternatively, the system can receive an indication of a computer-based tool to include with and/or in the prompt. At block 612, the system can transmit a prompt to a large language model. The prompt can include the natural language query, the indication of the format, and/or other features of a prompt (e.g., indication of a computer-based tool). At block 616, the system can receive, from the LLM, a first response to the prompt. The first response can include (and may expectedly include) a first system command in the format of the target computer language. At block 620 the system can determine and/or receive an indication of a mistake in the first response to the prompt. For example, the system may determine that the first response to the prompt fails to include reference to the computer-based tool, fails to properly compute a computation task, includes superfluous information, is not logically coherent or consistent, does not meet the specifications of the computer prompt, does not return a result, and/or includes some other insufficient response based on the details included in the prompt. At block 624, the system can update the format of the target computer language based on the mistake. The mistake can include one or more mistakes. Each mistake can correspond to an incompleteness, an inaccuracy, and/or the like. For example, a mistake may include a reference to incorrect name of tool, a reference to a different tool than an instructed computer-based tool from the prompt, a response not conforming to the format, a response that includes an unrecognized word, or a response using a syntax different from instructed by the prompt, and/or some other mistake. An incompleteness can include a failure to properly respond to a request included in the prompt. Such a failure may include a dearth of information, a lack of a use of a computer-based tool, or some other failure. An inaccuracy can include false information, such as a hallucination (e.g., creative but inaccurate response) from the LLM. Additionally or alternatively, the system may update the format of the target computer language by modifying a syntax (e.g., acceptable punctuation, acceptable phrasing and/or ordering of terms), grammar, list of acceptable terms for a command, or other aspect of the format of the custom computer language. Additionally or alternatively, the system can generate an indication of the updated format of the target computer language. The updated format may refer to text that a user sees in a user interface. The system may update a portion of future prompts that are sent to the LLM using the custom computer language. For example, the system may update a number of acceptable spellings, capitalizations, punctuations, etc. in the examples of format of the custom computer language sent to the LLM in future prompts. The updated format can be used in future prompts to the LLM. For example, a portion of prompts may include a standard set of instructions that may include instructions related to the format of the custom computer language (e.g., examples of grammar, etc.). This standard set of instructions may be updated so that future prompts include the updates in light of the identified mistakes.

The system can parse the first response to identify at least a first prompt to be provided to a computer-based tool. In some implementations, the system can generate, based on the parsing of the first response and the identified first prompt, a second prompt in a second computer language different from the target computer language. The system can perform other steps and/or include other features described herein, such as those described above with respect to FIG. 5.

Additional Example Implementations and Details Related to Computing Systems

In some implementations the systems described herein may comprise, or be implemented in, a "virtual computing environment". As used herein, the term "virtual computing environment" should be construed broadly to include, for example, computer-readable program instructions executed by one or more processors to implement one or more aspects of the modules and/or functionality described herein. Further, in this implementation, one or more services/modules/engines and/or the like of the system may be understood as comprising one or more rules engines of the virtual computing environment that, in response to inputs received by the virtual computing environment, execute rules and/or other program instructions to modify operation of the virtual computing environment. For example, a request received from a user computing device may be understood as modifying operation of the virtual computing environment to cause the request access to a resource from the system. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various implementations of the present disclosure may be a system, a method, and/or a computer program product at any possible technical detail level of integration. The computer program product may include a computer-readable storage medium (or mediums) having computer-readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer-readable storage medium (or mediums). Computer-readable storage mediums may also be referred to herein as computer-readable storage or computer-readable storage devices.

The computer-readable storage medium can be a tangible device that can retain and store data and/or instructions for use by an instruction execution device. The computer-readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer-readable program instructions may be callable from other instructions or from itself, and/or may be invoked in response to detected events or interrupts. Computer-readable program instructions configured for execution on computing devices may be provided on a computer-readable storage medium, and/or as a digital download (and may be originally stored in a compressed or installable format that requires installation, decompression, or decryption prior to execution) that may then be stored on a computer-readable storage medium. Such computer-readable program instructions may be stored, partially or fully, on a memory device (e.g., a computer-readable storage medium) of the executing computing device, for execution by the computing device. The computer-readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart(s) and/or block diagram(s) block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus.

The bus may carry the data to a memory, from which a processor may retrieve and execute the instructions. The instructions received by the memory may optionally be stored on a storage device (e.g., a solid-state drive) either before or after execution by the computer processor.

The flowcharts and block diagrams in the Figures illustrate the architecture, functionality, and operation of possible implementations of systems, methods, and computer program products according to various implementations of the present disclosure. In this regard, each block in the flowchart or block diagrams may represent a service, module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted or optional in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above implementations may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows 11, Windows Server, and/or the like), Windows CE, Unix, Linux, SunOS, Solaris, Blackberry OS, VxWorks, or other suitable operating systems. In other implementations, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 7 is a block diagram that illustrates a computer system 700 upon which various implementations may be implemented. For example, the computer system 700 may be implemented as the computing environment 100 (FIG. 1) in some implementations. Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some implementations, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one implementation, the techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative implementations, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

As described above, in various implementations certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain implementations, one or more of the computing devices and/or systems of the disclosure may include mobile computing devices, and user interfaces may be accessible through such mobile computing devices (for example, smartphones and/or tablets).

Many variations and modifications may be made to the above-described implementations, the elements of which are to be understood as being among other acceptable examples. All such modifications and variations are intended to be included herein within the scope of this disclosure. The foregoing description details certain implementations. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain implementations require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various implementations, it may be understood that various omissions, substitutions, and changes in the form and details of the devices or processes illustrated may be made without departing from the spirit of the disclosure. As may be recognized, certain implementations of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

Example Implementations

Examples of implementations of the present disclosure can be described in view of the following example implementations. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

In a 1st Example, a system comprises: one or more computer-readable storage mediums having program instructions embodied therewith; and one or more processors configured to execute the program instructions to cause the system to: receive, via a user interface, a natural language query; receive an indication of a format of a first computer language and an indication of one or more computer-based tools stored in and/or accessible by the system; transmit a prompt to a large language model ("LLM"), the prompt comprising at least: at least a portion of the natural language query, the indication of the format, and the indication of the one or more computer-based tools; receive, from the LLM, a response to the prompt, wherein the response is in the format of the first computer language; parse the response in the first computer language to identify at least: a first computer-based tool of the one or more computer-based tools, and a first query to be provided to the first computer-based tool; generate, based on the parsing of the response and the identified first query, a second query in a second computer language different from the first computer language; and provide the second query in the second computer language to the first computer-based tool.

In a 2nd Example, the system of Example 1, wherein the at least a portion of the natural language query comprises the indication of the format of the first computer language and the indication of the one or more computer-based tools stored in and/or accessible by the system.

In a 3rd Example, the system of any of Examples 1-2, wherein the indication of the format of the first computer language comprises an indication of a plurality of acceptable natural language terms for a computer command.

In a 4th Example, the system of Example 3, wherein each of the plurality of acceptable natural language terms comprise a common root term each having a different spelling, a different capitalization, and/or a different punctuation from another of the plurality of acceptable natural language terms.

In a 5th Example, the system of any of Examples 1-4, wherein the indication of the format comprises an indication of a grammar of the first computer language.

In a 6th Example, the system of any of Examples 1-5, wherein the one or more processors are configured to execute the program instructions to further cause the system to: parse the response in the first computer language to further identify: a second computer-based tool of the one or more computer-based tools, and a third query to be provided to the first computer-based tool.

In a 7th Example, the system of Example 6, wherein the one or more processors are configured to execute the program instructions to further cause the system to: generate, based on the parsing of the response and the identified third query, a fourth query in the second computer language; and provide the fourth query in the second computer language to the second computer-based tool.

In a 8th Example, the system of any of Examples 1-7, wherein providing the second query in the second computer language to the first computer-based tool comprises passing the second query to a second LLM configured to receive the second query in the second computer language and to operate on the second query using the first computer-based tool.

In a 9th Example, the system of any of Examples 1-8, wherein the one or more processors are configured to execute the program instructions to further cause the system to: determine and/or receive an indication of a mistake in the first response to the prompt.

In a 10th Example, the system of Example 9, wherein the one or more processors are configured to execute the program instructions to further cause the system to: update, based on the mistake, the format of the first computer language; and generate an indication of the updated format of the first computer language.

In a 11th Example, a computer-implemented method comprising: receiving, via a user interface, a natural language query; receiving an indication of a format of a first computer language and an indication of one or more computer-based tools stored in and/or accessible by a computer system; transmitting a prompt to a large language model ("LLM"), the prompt comprising at least: at least a portion of the natural language query, the indication of the format, and the indication of the one or more computer-based tools; receiving, from the LLM, a response to the prompt, wherein the response is in the format of the first computer language; parsing the response in the first computer language to identify at least: a first computer-based tool of the one or more computer-based tools, and a first query to be provided to the first computer-based tool; generating, based on the parsing of the response and the identified first query, a second query in a second computer language different from the first computer language; and providing the second query in the second computer language to the first computer-based tool.

In a 12th Example, the method of Example 11, wherein the at least a portion of the natural language query comprises the indication of the format of the first computer language and the indication of the one or more computer-based tools stored in and/or accessible by the system.

In a 13th Example, the method of any of Examples 11-12, wherein the first computer language comprises an indication of plurality of acceptable natural language terms for a common computer command.

In a 14th Example, the method of Example 13, wherein each of the plurality of acceptable natural language terms comprise a common root term each having a different spelling, a different capitalization, and/or a different punctuation from another of the plurality of acceptable natural language terms.

In a 15th Example, the method of any of Examples 11-14, wherein the indication of the format comprises an indication of a grammar of the first computer language.

In a 16th Example, a system for updating a format of a target computer language, the system comprising: one or more computer-readable storage mediums having program instructions embodied therewith; and one or more processors configured to execute the program instructions to cause the system to: receive, via a user interface, a natural language query; receive an indication of a format of a target computer language; transmit a prompt to a large language model ("LLM"), the prompt comprising at least: at least a portion of the natural language query and the indication of the format; receive, from the LLM, a first response to the prompt, the first response in the format of the target computer language; determine and/or receive an indication of a mistake in the first response to the prompt; update, based on the mistake, the format of the target computer language; and generate an indication of the updated format of the target computer language.

In a 17th Example, the system of Example 16, wherein the one or more processors are configured to execute the program instructions to further cause the system to: parse the first response to identify at least a first query to be provided to a computer-based tool.

In a 18th Example, the system of Example 17, wherein the one or more processors are configured to execute the program instructions to further cause the system to: generate, based on the parsing of the first response and the identified first query, a second query in a second computer language different from the target computer language.

In a 19th Example, the system of Example 18, wherein the one or more processors are configured to execute the program instructions to further cause the system to: provide the second query in the second computer language to the computer-based tool.

In a 20th Example, the system of any of Examples 16-19, wherein the indication of the format of the target computer language comprises an indication of a plurality of acceptable natural language terms for a computer command.

In a 21st Example, a computer-implemented method of any of Examples 1-20.

In a 22nd Example, a non-transitory computer-readable medium storing a set of instructions that are executable by one or more processors to cause one or more processors to perform the method of Example 21.

What is claimed is:

1. A system comprising:

one or more computer-readable storage mediums having program instructions embodied therewith; and one or more processors configured to execute the program instructions to cause the system to:

receive, via a user interface, a natural language query;

receive an indication of a format of a custom computer language and an indication of one or more computer-based tools stored in and/or accessible by the system, wherein an argument is described in natural language in the custom computer language, wherein the indication of the format of the custom computer language comprises an example grammatical structure in the custom computer language, and wherein the one or more computer-based tools use a second computer language having a second format different from the format;

transmit a prompt to a large language model ("LLM"), the prompt comprising at least: at least a portion of the natural language query, the indication of the format of the custom computer language, and the indication of the one or more computer-based tools;

receive, from the LLM, a response to the prompt, wherein the response is in the format of the custom computer language, wherein the format of the custom computer language provided in the prompt causes the LLM to generate the response in a first tokenized representation that has a higher token density than a second tokenized representation based on the second format of the second computer language;

parse the response in the custom computer language to identify at least: a computer-based tool of the one or more computer-based tools, a type of an element in the response, and a first query to be provided to the computer-based tool;

generate, based on the parsing of the response and the identified first query, a second query in the second computer language different from the custom computer language; and provide the second query in the second computer language to the computer-based tool.

2. The system of claim 1, wherein the indication of the format of the custom computer language and the indication of the one or more computer-based tools stored in and/or accessible by the system are received via the user interface.

3. The system of claim 1, wherein the indication of the format of the custom computer language comprises an indication of a plurality of acceptable natural language terms for a computer command.

4. The system of claim 3, wherein each of the plurality of acceptable natural language terms comprise a common root term each having a different spelling, a different capitalization, and/or a different punctuation from another of the plurality of acceptable natural language terms.

5. The system of claim 1, wherein the one or more processors are configured to execute the program instructions to further cause the system to:

parse the response in the custom computer language to further identify: a second computer-based tool of the one or more computer-based tools, and a third query to be provided to the computer-based tool.

6. The system of claim 5, wherein the one or more processors are configured to execute the program instructions to further cause the system to:

generate, based on the parsing of the response and the identified third query, a fourth query in the second computer language; and provide the fourth query in the second computer language to the second computer-based tool.

7. The system of claim 1, wherein providing the second query in the second computer language to the computer-based tool comprises using the computer-based tool to generate a second response, and wherein the one or more processors are configured to execute the program instructions to further cause the system to:

transmit the second query to the LLM based on the second response, the second query configured to instruct the LLM to respond in natural language;

receive from the LLM a third response comprising natural language; and generate data, based on the third response, for displaying a fourth response to a user.

8. The system of claim 1, wherein the one or more processors are configured to execute the program instructions to further cause the system to:

determine and/or receive an indication of a mistake in the response to the prompt.

9. The system of claim 8, wherein the one or more processors are configured to execute the program instructions to further cause the system to:

update, based on the mistake, the format of the custom computer language; and generate an indication of the updated format of the custom computer language.

10. The system of claim 1, wherein the type of the element is implicit in the response.

11. A computer-implemented method comprising:

receiving, via a user interface, a natural language query;

receiving an indication of a format of a custom computer language and an indication of one or more computer-based tools stored in and/or accessible by a computer system;

transmitting a prompt to a large language model ("LLM"), the prompt comprising at least: at least a portion of the natural language query, the indication of the format of the custom computer language, and the indication of the one or more computer-based tools, wherein an argument is described in natural language in the custom computer language, wherein the indication of the format of the custom computer language comprises an example grammatical structure in the custom computer language, and wherein the one or more computer-based tools use a second computer language having a second format different from the format;

receiving, from the LLM, a response to the prompt, wherein the response is in the format of the custom computer language, wherein the format of the custom computer language provided in the prompt causes the LLM to generate the response in a first tokenized representation that has a higher token density than a second tokenized representation based on the second format of the second computer language;

parsing the response in the custom computer language to identify at least: a computer-based tool of the one or more computer-based tools, a type of an element in the response, and a first query to be provided to the computer-based tool;

generating, based on the parsing of the response and the identified first query, a second query in the second computer language different from the custom computer language; and providing the second query in the second computer language to the computer-based tool.

12. The computer-implemented method of claim 11, wherein the at least a portion of the natural language query comprises the indication of the format of the custom computer language and the indication of the one or more computer-based tools stored in and/or accessible by the computer system.

13. The computer-implemented method of claim 11, wherein the custom computer language comprises an indication of plurality of acceptable natural language terms for a common computer command.

14. The computer-implemented method of claim 13, wherein each of the plurality of acceptable natural language terms comprise a common root term each having a different spelling, a different capitalization, and/or a different punctuation from another of the plurality of acceptable natural language terms.

15. The computer-implemented method of claim 11, wherein the indication of the format comprises an indication of a grammar of the custom computer language.

16. A system for updating a format of a target computer language, the system comprising:

one or more computer-readable storage mediums having program instructions embodied therewith; and one or more processors configured to execute the program instructions to cause the system to:

receive, via a user interface, a natural language query;

receive an indication of a format of a custom computer language, wherein an argument is described in natural language in the custom computer language, wherein the indication of the format of the custom computer language comprises an example grammatical structure in the custom computer language;

transmit a prompt to a large language model ("LLM"), the prompt comprising at least: at least a portion of the natural language query and the indication of the format;

receive, from the LLM, a first response to the prompt in the format of the custom computer language;

determine and/or receive an indication of a mistake in the first response to the prompt; and automatically update, based on the mistake, the format of the custom computer language to generate an updated format, wherein the updated format is configured to reduce a likelihood of the LLM generating a second response with the same mistake thereby improving accuracy of the LLM processing the custom computer language in the updated format.

17. The system of claim 16, wherein determining and/or receiving the indication of the mistake comprises determining that the first response to the prompt fails to include reference to a computer-based tool.

18. The system of claim 16, wherein the mistake comprises at least one of: a hallucination, a reference to a tool that does not exist, a reference to incorrect name of tool, a reference to a different tool than an instructed computer-based tool from the prompt, a response not conforming to the format, a response that includes an unrecognized word, or a response using a syntax different from instructed by the prompt.

19. The system of claim 16, wherein updating the format of the custom computer language comprises increasing a number of acceptable terms for a computer command.

20. The system of claim 16, wherein updating the format of the custom computer language comprises at least one of: modifying an acceptable punctuation of one or more examples of the format of the custom computer language, modifying an acceptable punctuation of the format of the custom computer language, modifying an acceptable phrasing and/or ordering of terms of the format of the custom computer language, updating an acceptable grammar of the format of the custom computer language, or updating a list of acceptable terms for a command.

* * * * *